United States Patent [19]

Kurahashi et al.

[11] 4,139,803

[45] Feb. 13, 1979

[54] METHOD AND APPARATUS FOR DETECTING THE LOCATION OF A LIGHT DETECTING PEN ON A GAS DISCHARGE DISPLAY PANEL

[75] Inventors: Keizo Kurahashi, Nagoya; Michihiro Shimizu, Akashi; Shizuo Andoh; Kazuo Yoshikawa, both of Kobe, all of Japan

[73] Assignee: Fujitsu Limited, Japan

[21] Appl. No.: 741,419

[22] Filed: Nov. 12, 1976

[30] Foreign Application Priority Data

Nov. 12, 1975 [JP] Japan .................................. 50/136659

[51] Int. Cl.² .............................................. G06F 3/14
[52] U.S. Cl. .................................. 340/707; 315/169.4; 340/758; 340/771
[58] Field of Search ............ 315/169 TV; 340/324 M, 340/337; 365/116

[56] References Cited

U.S. PATENT DOCUMENTS

| 3,651,509 | 3/1972 | Ngo | 315/169 TV |
|---|---|---|---|
| 3,832,693 | 8/1974 | Ishizaki et al. | 340/173 PL |
| 3,851,327 | 11/1974 | Dinh-Tuan Ngo | 315/169 TV |
| 3,875,472 | 4/1975 | Schermerhorn | 315/169 TV |
| 3,887,767 | 6/1975 | Miller | 340/173 PL |
| 3,967,267 | 6/1976 | Ngo | 315/169 TV |
| 3,976,992 | 8/1976 | Criscimagna et al. | 315/169 TV |
| 4,030,091 | 6/1977 | Ngo | 340/324 M |

OTHER PUBLICATIONS

*IEEE Transactions On Electron Devices,* 1975, pp. 796-799, T. N. Criscimagna et al., "Light-Pen Detection With A Plasma Display Panel".

*Primary Examiner*—Maynard R. Wilbur
*Assistant Examiner*—Lawrence Goodwin
*Attorney, Agent, or Firm*—Staas & Halsey

[57] ABSTRACT

In conjunction with an AC plasma display panel a light detecting pen is employed to designate coordinate points on the panel. Circuitry is employed to scan the electrodes of the panel with sustain voltage pulses at predetermined intervals and determine the coincidence of a selectively applied sustain voltage pulse with light detected by the light pen to indicate the location of the light pen with respect to the panel. A negative scanning method is also disclosed wherein coincidence between a sustain voltage pulse which is selectively not applied and the non-detection of light indicates the location.

5 Claims, 8 Drawing Figures

METHOD AND APPARATUS FOR DETECTING THE LOCATION OF A LIGHT DETECTING PEN ON A GAS DISCHARGE DISPLAY PANEL

BACKGROUND OF THE INVENTION

1. Field of the Invention

This invention relates to a read out method for a gas discharge display panel, and specifically a new method and apparatus for detecting the coordinate location of a light-detecting pen on an AC plasma display panel.

2. Description of the Prior Art

Typically, a gas discharge display panel having plural row (X) and column (Y) electrodes coated with dielectric layers, arranged face-to-face across a gap filled with a discharge gas is well known as an AC plasma display panel. When such AC plasma display panels are employed in computer terminals, it is often desirable to achieve man-machine communication by using a light-pen. This type of communication is well known in the case of existing terminals utilizing cathode ray tube displays. However, AC plasma display panels have inherent memory functions so that display information, once memorized is displayed repeatedly by means of applying sustain voltage pulses. Therefore, with respect to plasma display panels, the recognition of the coordinate location of a light-pen by making use of a time scanning sequence, as is done by an electron beam in CRT displays, has not been achieved.

In the past, various concepts have been proposed for employing a light-pen detection system in conjunction with a plasma display panel. One such proposal for using a light-pen is disclosed in U.S. Pat. No. 3,651,509 issued to D. T. Ngo. In the Ngo patent, it is proposed that each cell is scanned sequentially by an inquiry signal made up of a paired write scanning pulse followed by an erase scanning pulse.

Another proposal is described in a paper titled "Light-Pen Detection with a Plasma Display Panel" reported by T. N. Criscimagna et al., IEEE Transactions, Vol. ED-22, No. 9, September, 1975, page 796 to 799. According to the Criscimagna et al. proposal, in order to prevent the influence of a reduced sustain margin due to the use of a particularly prepared inquiry signal, a pulse equivalent to the sustain voltage pulse is used as the ideal inquiry signal.

However, the existing prior art techniques have the following disadvantages: the system configuration is quite complicated and the control of driving timing of each circuit is also complicated. On the other hand, although the reading of an "on" cell can be done through the application of a selective sustain voltage pulse as will be discussed below, it has been impossible to read out the information of an "off" cell by such a sustain pulse.

SUMMARY OF THE INVENTION

Therefore, an object of the present invention is to offer a simple and economical light-pen detection system for an AC type plasma display panel.

Another object of this invention is to offer a highly reliable detection system which can accurately read out the coordinate location of a light-pen positioned on an AC plasma display panel without adversely influencing the sustain margin.

A further object of this invention is to offer a new read out system which can easily and accurately recognize a desired character display block with a light-pen in conjunction with a character display system employing an AC plasma matrix display panel.

A further object of the present invention is to provide a light-pen detection system which can recognize a character display block of individual display cells corresponding to a block indicated by the light pen irrespective of the on/off conditions of the cell block for the character display, by making use of a display block and/or a corresponding cursor display area.

According to the first two objects of this invention, a sustainer circuit configuration, divided according to electrodes or electrode groups, is employed and the scanning by the sustain voltage pulse itself from the abovementioned sustainer circuit is carried out for each electrode in the row (X) or column (Y), or each electrode group, at the time of a "read out" operation, for the purpose of determining the coordinate location of the light pen positioned on the panel.

In addition, according to another embodiment of this invention, the row (X) and column (Y) electrodes related to a predetermined display block, for example the character display block itself, and/or a cursor display area associated therewith are connected to individual sustainer circuits for each block. After all cursor display areas are once set in the "on" or "off" state, the sustain voltage pulses from the sustainer circuits are applied sequentially and selectively to each display block. Then, the coordinate location is determined when the light pen detects the light emitted by discharge at the time the selective sustain voltage pulse is applied. This coincidence of detection and selective application of the sustain voltage is determinative of a coordinate location, which is then stored for read out.

BRIEF DESCRIPTION OF THE DRAWINGS

Other objects and characteristics of this invention will be further understood by explanation of the embodiments described below and by referring to the following drawings.

DESCRIPTION OF THE PREFERRED EMBODIMENTS

Figure 1:
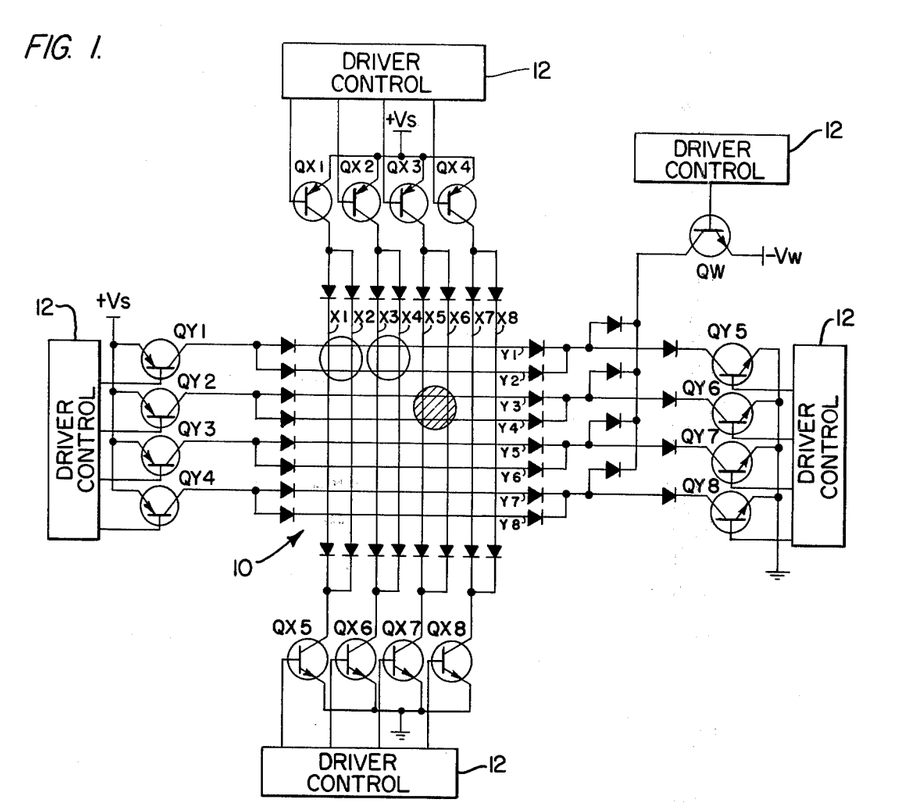
FIG. 1 is a circuit diagram illustrating the principle of the read out system conforming to the present invention.

In FIG. 1, a plasma display panel 10 is shown as a dot matrix type panel having eight row (X) electrodes X1-X8 and eight column (Y) electrodes Y1-Y8, wherein the X electrodes are orthogonal with respect to the Y electrodes. Therefore, a total of 64 discharge cells are defined at the intersections of these row and column electrodes. Of course, it is understood that a larger number of electrodes are used in actual practice, in order to have a sufficient number of discharge cells to display many kinds of graphics and character. The term "discharge cell", used herein, is defined as any individual discharge area formed at the intersection of row and column electrodes.

Figure 2:
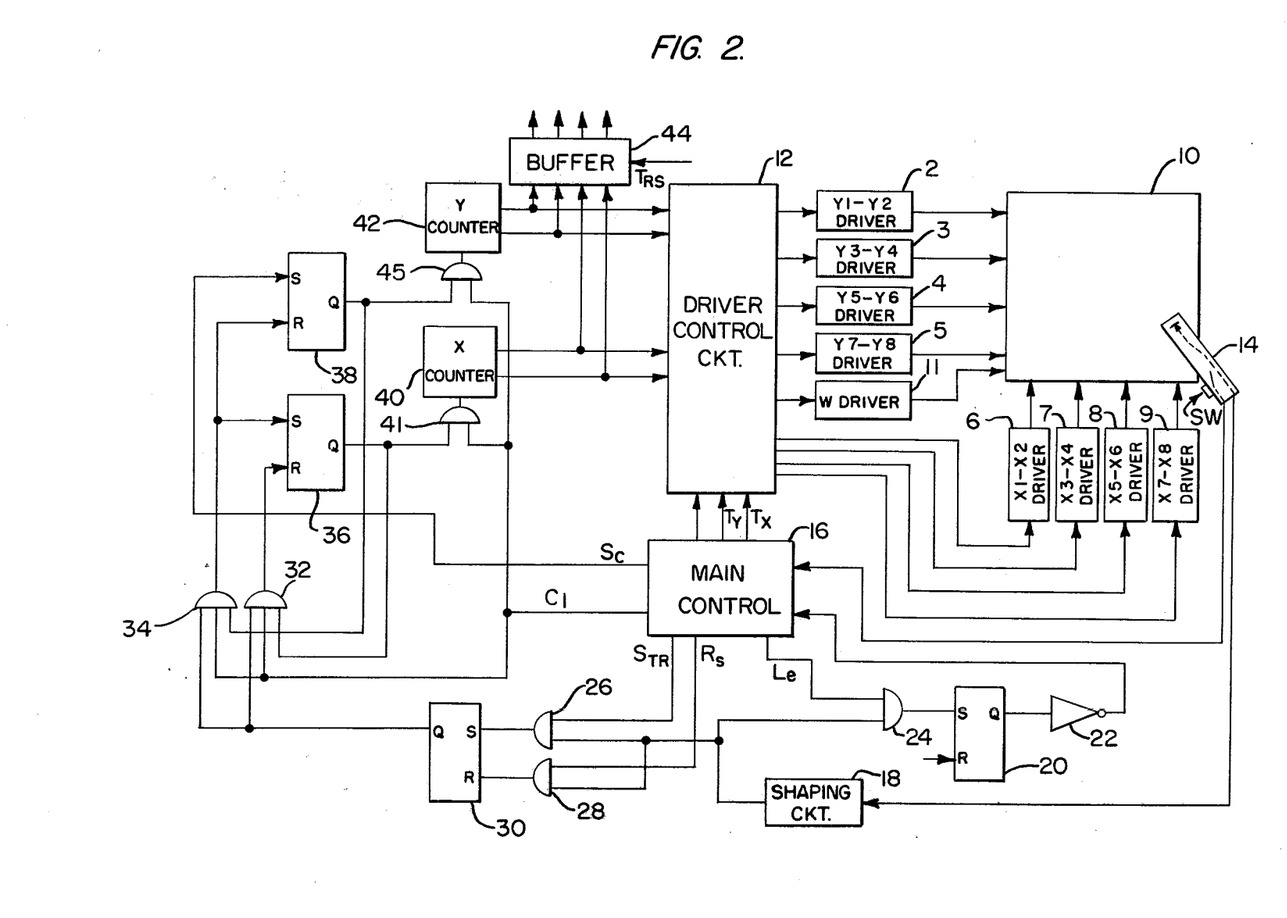
FIG. 2 is a block diagram of an embodiment of the present invention.

According to a first embodiment of the present invention, pairs of adjacent electrodes on the X side of the panel 10 are connected to corresponding ones of four sustain driver circuits 6, 7, 8 and 9, as shown in FIG. 2. Similarly, pairs of adjacent electrodes on the Y side of the panel 10 are connected to corresponding ones of four sustain drive circuits 2, 3, 4 and 5, as shown in FIG. 2. The sustain driver circuits supply sustain voltage pulses to corresponding pairs of electrodes so that the scanning for each display block can be achieved by use of the sustain voltage pulse.

As is seen in FIG. 1, the sustain circuits respectively include an up-transistor (normally biased in an off condition) for supplying the sustain voltage $V_s$ to a corresponding electrode pair and a down-transistor (normally biased in an off condition) for connecting said corresponding electrode pair to ground potential. The up-transistors QX1 to QX4 are connected to four X electrode pairs in the X side, while the down-transistors QX5 to QX8 are connected to corresponding X electrode pairs. Similarly, on the Y side, up-transistors QY1 to QY4 are connected to four Y electrode pairs, while the down-transistors QY5 to QY8 are connected to corresponding Y electrode pairs. Transistor QW is connected between the half select write voltage $-V_w$ supply and each Y electrode pair so that half select write voltage $-V_w$ can be applied simultaneously to all electrodes in the Y side. The half select write voltage $-V_w$ is of sufficient value that when it is applied to the Y electrodes at the same time that a sustain voltage $V_s$ is also applied to any or all of the X electrodes, the firing voltage is exceeded and discharge occurs. Although circuitry for selectively applying write voltage pulses and erase voltage pulses to each discharge cell location is not illustrated, such circuits are conventional and are understood to be usable in the present invention.

When only the abovementioned up-transistors QX1 to QX4 in the X side and the down-transistors QY5 to QY8 in the Y side only are controlled by the driver control circuitry to be in an "on" condition (conductive state) during an ordinary sustain operation, the X electrodes are at a sustain voltage potential $V_s$ with respect to the Y electrode. Alternately, when only the down-transistors QX5 to QX8 in the X side and down-transistors QY5 to QY8 in the Y side only are controlled to the "on" condition, the potential of the X electrodes X1 to X8 becomes zero with respect to the Y electrodes. Succeedingly, when only the up-transistors QY1 to QY4 in the Y side and down-transistors QX5 to QX8 in the X side are controlled to the "on" condition, the Y electrodes Y1-Y8 are at a sustain voltage potential $V_s$ with respect to the X electrodes. When only the down-transistors QY5 to QY8 in the Y side and the down-transistors QX5 to QX8 in the X side are controlled to the "on" condition, the potential of the Y electrodes Y1-Y8 becomes zero with respect to the X electrodes. This type of sequential switching operation is repeated by means of a timing control signal and the sustain voltage $V_s$ is supplied alternately to the X electrodes and the Y electrodes in the form of a pulse at each discharge cell location.

In FIG. 1, the sustain driver circuits (corresponding to those shown in FIG. 2) are shown to comprise both up and down-transistors corresponding to individual electrode pairs so that when individual X and Y sustainer circuits are selectively driven, four corresponding discharge cell locations (shown in circles) are controlled to operate as one discharge "block" location.

When up-transistors QX1 to QX4 in the X side and the write transistor QW are selectively turned on, a voltage potential of $(V_s + V_w)$ is applied to all the discharge cell locations and discharge occurs in all the cells of gas discharge panel 10. This is, of course, assuming that all the down-transistors QX5–QX8 and QY5–QY8 are off. Discharge occurs, since $V_s + V_w$ is higher than the firing voltage.

This principle is employed when it is desired to obtain the coordinate location on the panel of a light detecting pen which is placed thereon. In that case, since each sustain driver is operated selectively, the corresponding location of the light pen is determined according to the particular X and Y selected sustain drivers which caused a detected block location to discharge.

Figure 3:
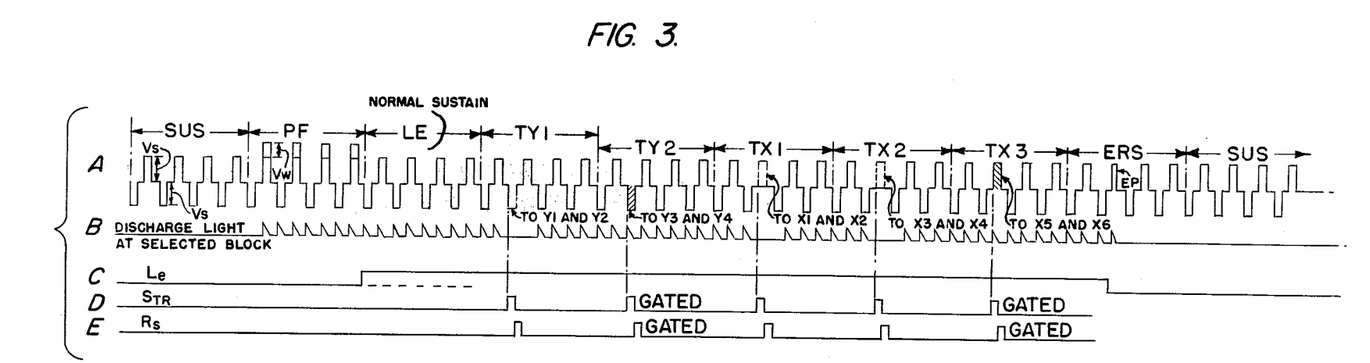
FIG. 3 is a signal timing chart illustrating the read out operation.

FIG. 2 shows a block diagram of an embodiment of the present invention. FIG. 3 shows waveforms for explaining the operation of the embodiment shown in FIG. 2, as particularly related to the discharge cells on the Y electrodes Y3 and Y4 and the X electrodes X5 and X6. The X sustain drivers 6, 7, 8 and 9 and Y sustain drivers, 2, 3, 4 and 5, shown in FIG. 2, each contain up and down transistors, as discussed with respect to FIG. 1. The sustain drivers are controlled to selectively apply the sustain voltage pulse $V_s$ to the gas discharge panel 10. A light pen 14 includes a photo-electro transducer, such as a photo-diode, to sense light when placed at selected locations on the panel 10. A switch SW is manually operated during a "read out" function.

During normal operation, flip-flops 20 and 30 are each in their respective reset condition and a driver control circuit 12 supplies control signals to the sustain driver circuits, according to timing signals Tx and Ty from a main control circuit 16. Thus, during normal operations an AC sustain voltage pulse is applied in common to all the discharge cells of the gas discharge panel 10, as mentioned above. This time period of applying the sustain voltage pulse to all the discharge cells is termed the "sustain" period, and is indicated as "SUS" in the waveform of FIG. 3A.

During the read out condition, when it is desired to read out the coordinate location of the light pen 14, the switch SW is depressed (closed) and the light pen 14 is at a desired coordinate location on the gas discharge panel 10. The main control circuit 16 responds to the closed switch SW and activates the write transistor QW, in W driver 11, during the same time as the sustain voltage is applied to the up-transistors on the X side, thereby causing all discharge cells to be set "on" (fired). Namely, the voltage $(V_s + V_w)$ is applied during the "pen firing" period "PF" in FIG. 3A and each discharge cell illuminates as a result of the discharge. The waveform in FIG. 3B shows the duration of light emission pulses as a result of the application of the $V_s + V_w$ pulses causing the discharge.

During the "light emitting" period "LE" after the period PF, when all the cells are discharged, ordinary sustain voltage pulses are applied and a light enable signal $L_e$ shown in FIG. 3C is "1" until the read out of the light pen location is completed. A detected output of the light pen 14 is subjected to waveform shaping in shaping circuit 18 so that a signal is developed which is at a predetermined level, higher than the output of the light pen. The waveform shaping circuit 18 receives the output from the light pen 14 and then applies the shaped signal to AND gates 24, 26 and 28. The flip-flop circuit 20 is set by the output of AND gate 24 and the output of inverter circuit 22 becomes "0".

It should be noted, that if the gas discharge panel 10 does not illuminate when the light enable signal $L_e$ is "1", or if the light pen 14 does not detect the panel illumination, the flip-flop circuit 20 will not be set and output of the inverter circuit will remain "1". Such a signal from the inverter can be gated with the write enable signal $W_e$, for example, and be employed as an alarm signal to indicate a failure of the panel illumination control or the light pen detection.

During a time period beginning with "TY1" as is shown in FIG. 3, the main control circuit 16 sets the flip-flop 38 with a "start scan command" signal $S_c$, when the switch SW of the light pen 14 is closed. The output of the flip-flop 38 is applied to the AND gate 45, allowing the clock signal pulses $C_1$ from the main control circuit 16 to be gated to the Y counter 42. The contents of the Y counter 42 are supplied to the driver control circuit 12 and the sustain driver circuits 2, 3, 4 and 5 are selectively controlled according to the count value in the Y counter 42. Accordingly, the sustain driver 2 is the first to be selected and a sustain voltage is applied to electrode pair Y1 and Y2.

While the Y sustain drivers are being selectively controlled, the X sustain drivers 6, 7, 8 and 9 are commonly controlled so that all the X electrodes are driven in common with sustain voltage pulses.

Also during the TY1 period main control circuit 16 generates a strobe pulse $S_{TR}$ which is immediately followed by a reset pulse Rs as shown in FIGS. 3D and 3E.

Referring again to FIG. 1, a block of four discharge cells at the intersections of electrodes X5, X6 with electrodes Y3, Y4 is designated, for illustration purposes, to correspond to the location of the light pen 14. A series of pulses are shown in FIG. 3A as being applied to the block of the designated discharge point over different periods of time. The corresponding light emission, by discharge at the designated block is shown in FIG. 3B. In this case, the sustain operation period is repeatedly sequenced so that all the X sustain drivers operate in common each time any of the Y sustain drivers are selectively operated according to the content of Y counters 42 in order to sustain any information previously written in the remaining discharge cells.

Similarly, all the Y sustain drivers are operated in common each time any of the X sustain drivers are selectively operated according to the content of an X counter 40.

During the TY1 period, the pulse shown by the dashed line in the waveforms of FIG. 3A indicates that the Y sustain driver 3 is not selected during that time period. During the next subsequent period TY2, the pulse shown as shaded is applied to the Y3-Y4 electrodes, since the Y sustain driver 3 is selected.

Therefore, during the period TY1 where the Y electrodes Y1 and Y2 receive the selective sustain pulse, the selective sustain pulse indicated by the dashed line is not applied to the Y electrodes Y3 and Y4 (corresponding to the selection location of the light pen 14). Therefore, the light pen 14 cannot detect light emission at the designated block during the TY1 period. The strobe signal $S_{TR}$ is generated, as shown in FIGS. 3D, during the time when the Y sustain drivers are selectively operated. Immediately after each strobe signal $S_{TR}$ is generated, a reset pulse $R_{ST}$ is generated, as is shown in FIG. 3E.

As mentioned previously, since the detected output of the light pen 14 is zero at the time when the Y sustain driver 2 is selected, the output of the AND gate 26 is zero.

Then, the Y sustain driver 3 is selected according to the content of the Y counter 42 and when the selective sustain pulse (indicated by the shading) in the period TY2 of FIG. 3 is applied to the Y electrode pair Y3 and Y4, the strobe pulse from the main control 16 is gated by AND gate 26 and the flip-flop 30 is set. When the flip-flop 30 is set, the output of the flip-flop 30 gates "clock pulse $C_1$ through AND gate 34". A third input to AND gate 34 is the set output from flip-flop 38. Therefore, since the input of AND gate 34 is connected to the reset output of flip-flop 38 one set input of flip-flop 36, one gated clock pulse causes the Y counter 42 to stop counting and the X counter 40 to start counting. When the flip-flop 38 is reset, the clock signal $C_1$ to the Y counter 42 is no longer gated. However, when the flip-flop 36 is set, the clock signal $C_1$ to the X counter 40 via the AND gate 41 is gated.

In other words, the counting content of the Y counter 42, at the time the flip-flop 38 is reset, indicates the Y coordinate position of the light pen 14 with respect to the panel 10, count value is set in a buffer register 44. The output of the AND gate 28 becomes "1" by the detected output of the light pen 14 ANDed with the occurance of reset pulse $R_s$. Thus, the flip-flop 30 is reset.

When the X counter 40 starts counting the clock signal pulses $C_1$ as mentioned above, the X sustain drivers 6-9 are selected according to the count value in the counter 40, and scanning of the X electrode is achieved. During this period, designated as TX1, the sustain drivers 2-5 are commonly selected. During the TX1, the X sustain driver 6 is selected and a selective sustain pulse is applied to the $X_1$ and $X_2$ electrodes. In the period TX2, the X sustain driver 7 is selected and a selective sustain pulse is applied to the $X_3$ and $X_4$ electrodes. However, the light pen 14 does not detect light at the designated block during these periods (TX1 and TX2) since the sustain driver 8 is not then selected. During the period TX3, the X sustain driver 8 is selected and when the selective sustain pulse (indicated by the shaded pulse) is impressed to only the electrodes X5 and X6, the designated block emits light and the output of the light-pen 14 indicating light detection, gates the strobe pulse $S_{TR}$ through AND gate 26 and the flip-flop 30 is set.

When this flip-flop 30 is set, the output of the AND gate 32 becomes "1", since a clock signal pulse $C_1$ is gated therethrough and the flip-flop 36 is reset. The AND gate 41 is then off and the X counter 40 stops counting the clock signal pulses $C_1$. At this time, the count value in counter 40 shows the X coordinate of the position detected by the light-pen 14 and this count value is set into the buffer register 44.

At this point, the content of the buffer register 44 corresponds to the coordinates of the X and Y axes of the position detected by the light-pen 14. The contents of the buffer 44, corresponding to the coordinates of X and Y axes are then transferred (read out) to auxiliary control equipment (not shown) by means of the transfer signal $T_{RS}$.

As mentioned above, location designated by the light-pen 14 is read out as the coordinates of the X and Y axes according to the content of the Y counter 42 and the X counter 40. Upon completion of this read out, the narrow erase pulse EP is applied to all discharge cells during the erase period ERS, to completely erase the cells. During the sustain period SUS, ordinary sustain voltage pulses are applied. Then, operations, such as writing, are performed at locations corresponding to the location of the light pen 14.

The embodiment described above is employed where the electrodes are respectively paired in each of the X and Y sides and the read out is obtained by scanning the selective sustain pulse as applied to each of the display blocks including four discharge cells. However, a more rapid read out operation is possible where each display block consists of a higher number of discharge cells on the plasma display panel. A desirable embodiment of such a read out technique is described hereinbelow.

Figure 4:
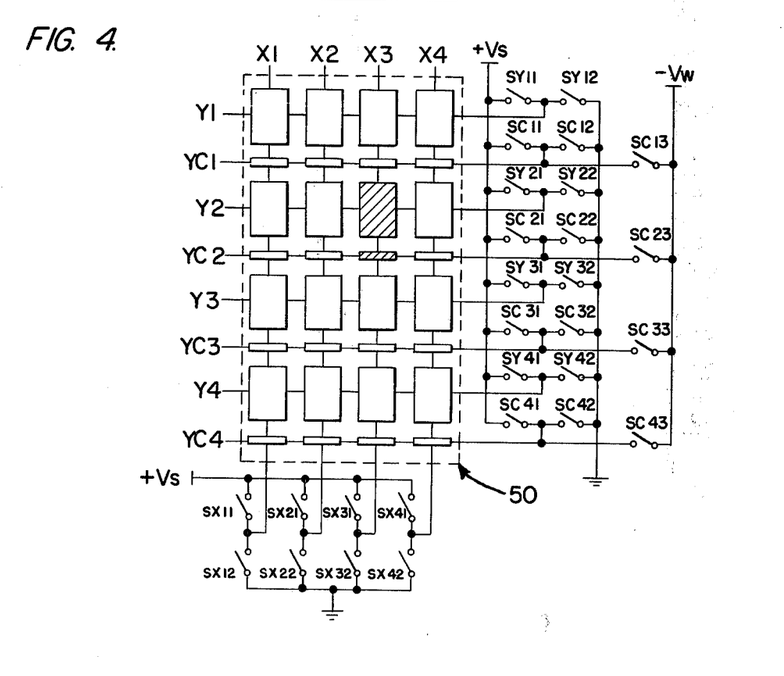
FIG. 4 is a circuit diagram illustrating another embodiment of the present invention.

FIG. 4 shows the outline of a second embodiment of the present invention. in FIG. 4, a plasma display panel 50 is conceptually shown with four electrode groups in the X side, respectively represented by conductor lines X1 to X4; four electrode groups in the Y side, respectively represented by conductor lines Y1 to Y4; and cursor display electrodes represented by conductor lines YC1 to YC4. Each of the electrode groups X1 to X4 include five (5) or seven (7) electrodes while each of the Y electrode groups Y1 to Y4 correspondingly, include seven (7) or nine (9) electrodes. Thus, at the intersections between X and Y electrode groups, a total of 16 character display blocks consisting of 35 (5 × 7) or 63 (7 × 9) discharge cells are given. At the intersections of the cursor display electrodes YC1 to YC4 and the X electrode groups X1 to X4, cursor display blocks are defined as being associated with the corresponding character display blocks. That is, YC1-X1 is associated with Y1, X1 . . . , and YC4-X4 is associated with Y4, X4.

$SY_{ij}$, $SC_{ij}$ and $SX_{ij}$ (i, j = 1, 2, . . . .) are schematically shown as switching elements, which are normally of discrete or LSI transistors, or the like. When $SX_{i1}$, $SY_{i2}$ and $SC_{i2}$ all become closed, a voltage of $+V_s$ is applied to the electrode groups in the X side. When $SX_{i2}$, $SY_{i2}$ and $SC_{i2}$ all become closed, the potential of the electrode groups in both the X and Y sides is zero. When $SX_{i2}$, $SY_{i1}$ and $SC_{i1}$ become closed, the voltage of $+V_s$ is applied to the electrode groups in the Y side. When $SX_{i2}$, $SY_{i2}$ and $SC_{i2}$ become closed, the potential of electrode groups in both the X side and Y side is zero. The sustain voltage pulse $+V_s$ is applied by repeating the above switching operation. Thereby, characters are written in the character display block corresponding to the cursor display position by means of the cursor display block having a $-V_w$ write voltage selectively applied to the selective cursor electrode. Thus, storing and display are carried out by the abovementioned sustain voltage pulse. In this embodiment depicted in FIG. 4, the abovementioned character display block is defined as the block for displaying information, while the cursor display block is defined as the block for read out. Thus, when designating a block as an information display area, the corresponding cursor display block is designated by the light pen. For example, when designating the character display block at the intersection of electrode group X3 and Y2, the cursor display block at the intersection of electrode groups X3 and YC2 is designated by a light pen.

In addition, when reading the location of the position designated by the light pen, the switching elements $SC_{i3}$ and $SX_{i1}$ are turned ON and the voltage of $(V_s + V_w)$, being higher in value than the discharge start voltage, is then applied as a write operation to all of the cursor display blocks. During the next step, a sustain voltage pulse is selectively applied to the cursor display blocks by control of the switching elements $SC_{i1}$, $SC_{i2}$ and $SX_{ij}$. The read out of the designated position is achieved when the light pen detects the light emission caused by discharge at the corresponding cursor display block when the sustain voltage pulse is applied thereto. During this period, an ordinary sustain voltage pulse is also applied to the character-display block. Therefore, the designated position can be read out without adversely influencing displayed information.

Figure 5:
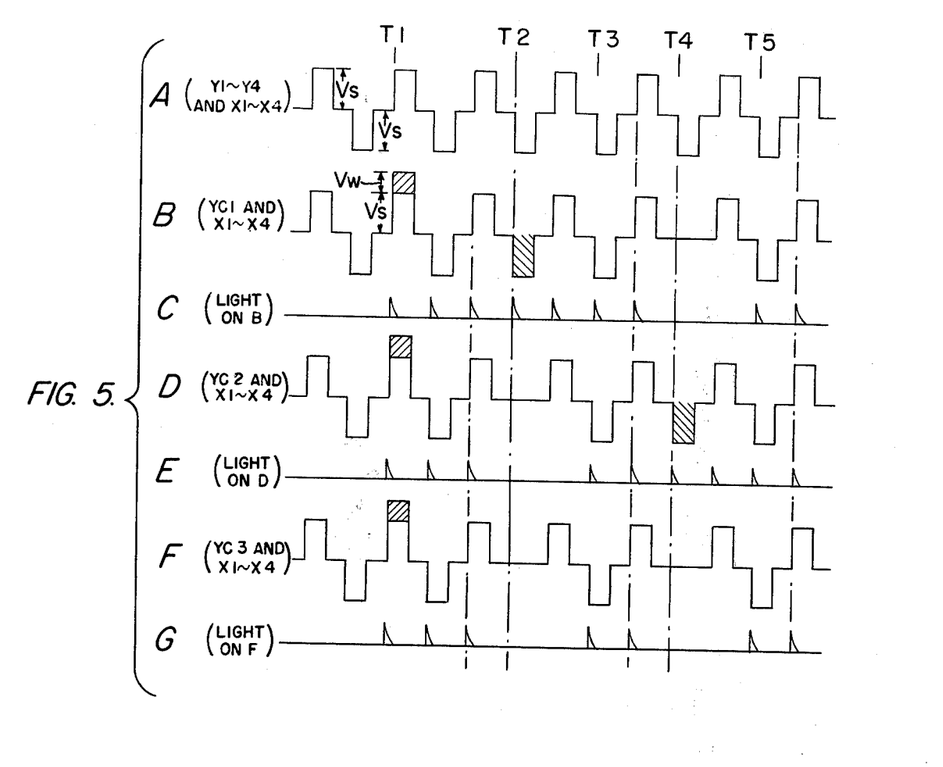
FIG. 5 is a signal timing chart illustrating the read out operation by a positive sustain scanning signal.

FIG. 5 shows waveforms present in the embodiment shown in FIG. 4, during the operation thereof. In FIG. 5, "A" is the sustain voltage pulse waveform applied to the character display blocks; "B" is the pulse waveform applied to the cursor display blocks in the electrode group YC1; "C" is the discharging light emission waveform of the YC1 cursor display blocks; resulting from waveform B; "D" is the pulse waveform applied to the cursor display blocks in the electrode group YC2; "E" is the discharging light emission waveform of the YC2 cursor display blocks, resulting from waveform D; "F" is the pulse waveform applied to the cursor display block in the electrode group YC3; and "G" is the discharging light emission waveform of the YC3 cursor display blocks, resulting from waveform F.

When reading out the location of the position designated by the light pen, a read out operation is started by actuation of a switch, or the like being provided at the light pen (see FIG. 2). Commencing with a time T1, the pulse voltage of $(V_s + V_w)$ is applied to all cursor display blocks and discharge occurs. At a time T2, the sustain voltage pulse is only applied to the electrode group YC1; and at a time T4, the sustain voltage pulse is applied only to the electrode group YC2. At the times T3 and T5, the sustain voltage pulse is applied to all of the cursor electrode groups in order to prevent the previously written state from disappearing during the periods when the sustain voltage is not applied.

When the light detected output of the light pen is obtained during the duration of a sustain voltage pulse selectively applied to the YC2, a strobe pulse is produced and the position on the Y axis of the cursor display block is known from the content of a counter which counts the scanning of the sustain voltage pulses. Similarly, when the scanning of the sustain voltage pulse is commenced for the electrode groups X1 to X4 through the control of the switching elements $SX_{ij}$, the position of the X axis is obtained when a light detected output of the light pen is obtained during the time the sustain voltage pulse is selectively applied to Y3. When the X and Y coordinates are obtained, an erase operation is performed on the cursor display blocks. The erase operation can be achieved by selectively applying a narrow erase pulse to the electrode groups YC1 to YC4, through sequential control of the switching elements $SC_{i1}$, $SC_{i2}$.

The abovementioned coordinate location of the light pen on the X and Y axes may then be transferred to a control system, where writing can be made to the cursor display block at that position. Thereby, cursor display is achieved and erase or writing of information in the corresponding character display block can be performed, for instance, from a standard keyboard type input.

Figure 6A:
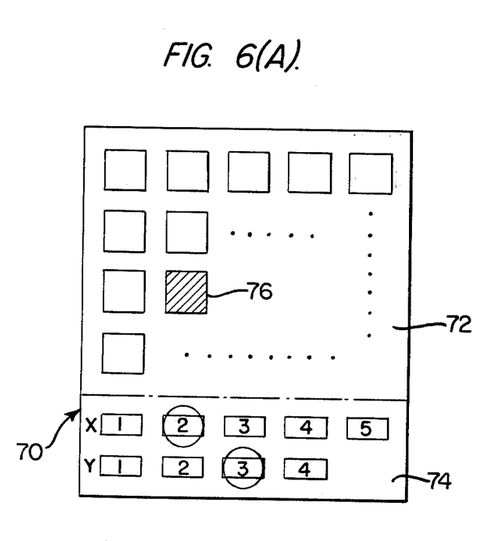
FIGS. 6A and 6B are pictorial views of other embodiments of the present invention providing display areas having X-Y located display blocks separated from read out areas having X and Y designated blocks.

FIG. 6A illustrates another embodiment of the present invention. Namely, a gas discharge panel 70 where an information display area 72 and a read out area 74 are shown as separately formed in respective upper and lower sections. Writing and erasing are performed by designating a character display block such as block 76 (shown with oblique lines) located at coordinate location X2, Y3. Corresponding blocks X2 and Y3 shown in the read out area 74 (with circles) are sequentially designated with a light pen according to the X2, Y3 coordinate display location. The sustain voltage pulses are selectively applied to the blocks in the area 74, as in the case of the abovementioned embodiment and read out of the position designated by the light pen is performed by gating the light detection output of light pen with the sustain voltage pulse. Thereby, the block designation of the information display area 72 can be made using the coordinate read out by designating the corresponding coordinate blocks in the read out area 74, with the light pen.

Figure 6B:
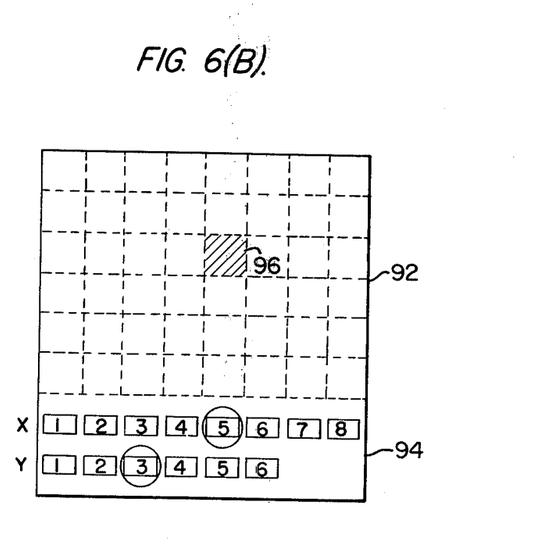

FIG. 6B explains an embodiment of the present invention, where it is utilized in a graphic display panel. In this embodiment, the information display area 92 is divided into several blocks as indicated by dotted lines and in the read out area 94, several blocks are formed, each of which indicates a coordinate for locating a corresponding display block. When it is desired to designate a block, such as 96 (indicated as a shaded block), coordinately located at X5, Y3, it can be achieved by selectively and sequentially placing the light pen at X = 5 and Y = 3 on the read out area 94. In FIG. 6B, these X and Y placement areas for the light pen are indicated as having circles around them, for illustrative purposes.

It is also possible to read out the coordinates of designated locations of the information display area in the case of the aforementioned embodiments shown in FIGS. 6A and 6B, by considering an embodiment wherein the peripheral of the gas discharge panel is employed as the read out area. In that case, one would designate a particular row and a particular column at the peripheral edge of the display area with a light pen.

In the abovementioned embodiments shown in FIGS. 6A and 6B, the number of blocks in the information display area do not correspond to the number in the read out area on a 1 to 1 basis. However, any specific block of the information display area can be designated, even if the area occupied by the read out area is narrow, since the blocks of the read out area designate the coordinates of the specific block of the information display area.

In the embodiments shown in FIG. 4, FIG. 6A and FIG. 6B, read out scanning by the sustain voltage pulse is carried out by making use of the read out area blocks associated with the display block to be read out. By providing such read out blocks, a non-destructive read out operation is ensured irrespective of the on-off condition of the associated display block. However, although the "display blocks" and "read out blocks" described here are limited to an integration of several discharge cells, they may also be in the form of a single discharge cell. In other words, the coordinates of one or several discharge cells in a display area on a plasma display panel can be read out by placing the light pen for detection of one or several read out discharge cells. However, in order to increase the amount of light received by the light pen and to make the detecting operation accurate, it is desirable to include a plurality of discharge cells in the individual read out blocks. For this purpose, when the discharge cells on the cursor line are used for read out, for example, Y electrodes provided in the space between lines adjacent to said cursor line and/or discharge cell group which gives the space in the right and left, upper and lower part of each display block can also be driven simultaneously. In addition, since non-destructive scanning by the selective sustain pulse is performed, scanning is made for the character display block in common with the cursor display block and the position of the display block in the "on" condition can be detected more accurately. When the scanning is carried out for the character display block together with the read out block associated therewith, the write operation of all the scanned blocks prior to the read out is of course performed for only the read out blocks. The period in the sequence from the write operation to the start of the read out operation is recommended to be as long as all discharge cells in all the read out blocks are maintained in an on or "fired" condition, so that the operator can visually check the position designated by the light pen.

Figure 7:
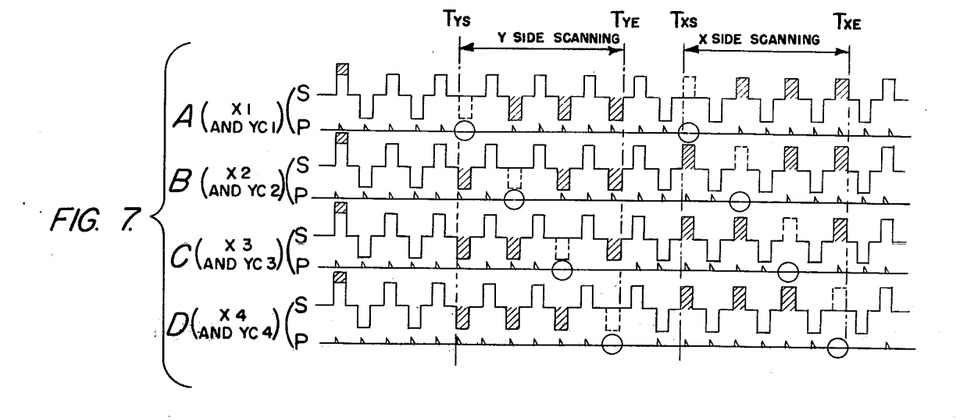
FIG. 7 is a signal timing chart illustrating a method of negative scanning in the embodiment shown in FIG. 4.

A further embodiment of the present invention provides for a negative scanning method wherein sustain voltage pulses for the read out block are sequentially and selectively not applied; instead of the method where the sustain voltage pulses are sequentially and selectively applied to the read out block. FIG. 7 shows pulse waveforms for explaining a negative scanning operation with respect to the FIG. 4 embodiment. In FIG. 7, "S" indicates the selective voltage waveforms and "P" indicates the corresponding time relationship of the emitted light for each read out block. The pulses which are not selectively applied to the corresponding read out blocks are indicated by the dotted lines. During the period from $T_{ys}$ to $T_{ye}$, the sustain voltage pulses for the Y electrode group (shown as the negative pulses in the pulse waveform) are sequentially not applied. During the period from $T_{xs}$ to $T_{xe}$, the sustain voltage pulses for the X electrode group (shown as the positive pulses in the pulse waveform) are sequentially not applied. Therefore, the discharge cells of each read out block, once set to the "on" condition by the write operation prior to the read out scanning operation are sequentially turned off and no light emission by discharge occurs during the timing when the sustain voltage pulses are not applied. Thus, by detecting this non-discharge occurance with the light pen, the coordinate location corresponding to the position designated by said light pen can be read out much the same as in the case of the abovementioned embodiments. In any case, where the sustain voltage pulse is selectively applied or is selectively not applied it is desirable that the occurance be during time of an ordinary sustain voltage pulse.

In order to obtain a higher speed read out operation than the above described read out sequence where scanning of X electrodes is carried out after the completion of scanning of the X electrodes, the scannings of Y and Y electrodes can be performed simultaneously, in parallel. Moreover, when the display screen is of a large scale the read out time can be shortened by adopting, for example, a binary dividing sequence such as is disclosed in U.S. Pat. No. 3,832,693 which was granted to H. Ishizaki et al.

The present invention is very effective for attaining man-machine communication using a light pen connected to a computer terminal which utilizes an AC plasma display panel. Furthermore, it will be apparent that many modifications and variations may be effected without departing from the scope of the novel concept of this invention. Therefore, it is intended by the appended claims to cover all such modifications and variations which fall within the true spirit and scope of the invention.

We claim:

1. A method of detecting the coordinate location of a light detecting pen positioned on a gas discharge panel having a matrix arrangement of discharge cells defined by a plurality of row and column electrodes, including the steps of:
    selectively applying a write voltage to said row and column electrodes of said gas discharge panel causing discharge in all discharge cells;
    selectively applying a normal sustain voltage to said row and column electrodes to maintain said discharges;
    providing a light pen for detecting light emitted from said discharge cells;
    accessing a desired location on said gas discharge panel with said light pen;
    detecting light emission of a discharge cell at said desired position when corresponding electrodes are selectively applied with said normal sustain voltage;
    determining the coordinate location of said desired position corresponding to a coincidence of detecting light emission and said selective application of said normal sustain voltage to said corresponding electrodes;
    said step of selectively applying a normal sustain voltage includes a step of sequentially applying a first normal sustain voltage to said row electrodes;
    said step of determining said coordinate location includes a step of determining coincidence of the application of said first normal sustain voltage to a row electrode with said light detection;
    said step of selectively applying a normal sustain voltage further includes a step of sequentially applying a second normal sustain voltage to said column electrodes following said row coincidence determining step; and
    said step of determining said coordinate location further includes a step of determining coincidence of the application of said second normal sustain voltage to a column electrode and light detection.

2. A method as in claim 1, wherein the step of selectively applying said sustain voltage is performed by sequentially applying said sustain voltage to predetermined groups of row and column electrodes; and said location is determined according to said determined coincidence with respect to said sustain voltage being applied to a corresponding selected group.

3. Apparatus for detecting the coordinate location of a light detecting pen positioned on a gas discharge panel having a matrix arrangement of discharge cells defined by a plurality of row and column electrodes, comprising:
    means for applying a write voltage to said row and column electrodes of said gas discharge panel causing discharge in all discharge cells;
    means for selectively applying a normal sustain voltage to said row and column electrodes to maintain said discharges;
    a light pen for detecting light emitted from said discharge cells when placed at a desired position on said gas discharge panel;
    means for determining the coordinate location of said desired position corresponding to a coincidence of detected light emission and the selective application of said normal sustain voltage to electrodes corresponding to said desired position;
    said means for selectively applying a normal sustain voltage includes means for sequentially applying a first normal sustain voltage to said row electrodes;
    said means for determining said coordinate location includes means for determining coincidence of the application of said first normal sustain voltage to a row electrode with said light detection;
    said means for selectively applying a normal sustain voltage further includes means for sequentially applying a second normal sustain voltage to said column electrodes; and
    said means for determining said coordinate location further includes means for determining coincidence of the application of said second normal sustain voltage to a column electrode and light detection.

4. An apparatus as in claim 3, wherein said means for determining said coordinate location further includes means for identifying said respective row and column electrodes for which coincidence is respectively determined, said identifying means providing an output signal indicative of the coordinate location of said light detecting pen with respect to said gas discharge panel.

5. An apparatus for designating a given discharge cell location in a gas plasma display panel having a plurality of individually addressable discharge cells comprising:
    means for addressing said plurality of discharge cells with a write voltage causing discharge at corresponding discharge cell locations;
    means for addressing said plurality of discharge cells with a sustain voltage for causing discharge to be maintained at corresponding discharge cell locations;
    said sustain voltage addressing means includes means for scanning said discharge cells by sequentially and selectively addressing said discharge cells with a zero voltage to cause said sequentially selected discharge cells to emit no light during said scan addressing;
    means for detecting light being positionable at said given discharge cell location;
    means for detecting coincidence of no light being emitted by the discharge cell at said given discharge cell location and the corresponding non-detection of light by said light detecting means with said zero voltage being addressed to said discharge cell at said given discharge cell location; and
    means for reading out said given location in accordance with said address corresponding to said determined coincidence.

* * * * *

UNITED STATES PATENT AND TRADEMARK OFFICE
CERTIFICATE OF CORRECTION

PATENT NO. : 4,139,803

DATED : February 13, 1979

INVENTOR(S) : Keizo Kurahashi et al

It is certified that error appears in the above-identified patent and that said Letters Patent are hereby corrected as shown below:

```
Column 6, line 30, "occurance" should be --occurrence--.
Column 7, line 19, "invention. in" should be --invention.  In--.
Column 10, line 47, "occurance" should be --occurrence--.
Column 10, lines 52-53, "occurance" should be --occurrence--.
Column 10, line 58, "Y" should be --X--.
```

Signed and Sealed this

Twenty-fifth Day of September 1979

[SEAL]

Attest:

LUTRELLE F. PARKER

Attesting Officer

Acting Commissioner of Patents and Trademarks